US008489877B2

(12) United States Patent
Ivanov et al.

(10) Patent No.: US 8,489,877 B2
(45) Date of Patent: *Jul. 16, 2013

(54) SYSTEM, METHOD AND COMPUTER PRODUCT FOR SENDING ENCRYPTED MESSAGES TO RECIPIENTS WHERE THE SENDER DOES NOT POSSESS THE CREDENTIALS OF THE RECIPIENT

(75) Inventors: Viatcheslav Ivanov, Thornhill (CA); Qinshen Lai, Toronto (CA); Michael Graves Mansell, Cedar Valley (CA); Michael Albert Roberts, Toronto (CA); Joseph Dominic Michael Sorbara, Toronto (CA)

(73) Assignee: Echoworx Corporation, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/167,822

(22) Filed: Jun. 24, 2011

(65) Prior Publication Data
US 2012/0060032 A1    Mar. 8, 2012

Related U.S. Application Data

(63) Continuation of application No. 10/843,319, filed on May 12, 2004, now Pat. No. 7,996,673.

(51) Int. Cl.
*H04L 29/06*    (2006.01)

(52) U.S. Cl.
USPC ......................................................... 713/168

(58) Field of Classification Search
None
See application file for complete search history.

(56) References Cited

U.S. PATENT DOCUMENTS

| 4,200,770 A | 4/1980 | Hellman et al. |
| 5,003,405 A | 3/1991 | Wulforst |

(Continued)

FOREIGN PATENT DOCUMENTS

| CA | 2350321 | 6/2001 |
| EP | 0 461 059 | 12/1991 |

(Continued)

OTHER PUBLICATIONS

"Diffie-Hellman Key Agreement Method," Rescoria, Network Working Group, RFC 2631, Jun. 1999.

(Continued)

*Primary Examiner* — Oscar Louie
(74) *Attorney, Agent, or Firm* — Bennett Jones LLP

(57) ABSTRACT

A system for encrypting and decrypting messages using a browser in either a web or wireless device or secure message client software for transmission to or from a web server on the Internet connected to an email server or message server for the situation where the sender does not possess the credentials and public key of the recipients. The encryption and decryption is conducted using a standard web browser on a personal computer or a mini browser on a wireless device, or message client software on either a personal computer or wireless devices such that messages transmitted to the web or wireless browser or message client software can be completed and encrypted and signed by the user such that encrypted and signed data does not require credentials and public key of the recipients. A method for delivering and using private keys to ensure that such keys are destroyed after use is also provided. A method of transmitting encrypted messages to a web or wireless browser or message client and decrypting and verifying such messages by recipients who do not possess or who are not enrolled in a PKI and do not have private keys. A method for authenticating the sender/user of the browser, and a method for accessing or generating public and private keys for encrypting and decrypting messages for recipients who are not enrolled in a public key infrastructure.

7 Claims, 11 Drawing Sheets

U.S. PATENT DOCUMENTS

| | | | |
|---|---|---|---|
| 5,136,647 A | 8/1992 | Haber et al. | |
| 5,343,529 A | 8/1994 | Goldfine et al. | |
| 5,345,506 A | 9/1994 | Tsubakiyama | |
| 5,410,693 A | 4/1995 | Yu et al. | |
| RE34,954 E | 5/1995 | Haber et al. | |
| 5,500,513 A | 3/1996 | Langhams et al. | |
| 5,559,888 A | 9/1996 | Jain et al. | |
| 5,615,268 A | 3/1997 | Bisbee et al. | |
| 5,649,185 A | 7/1997 | Antognini et al. | |
| 5,671,282 A | 9/1997 | Wolff et al. | |
| 5,680,460 A | 10/1997 | Tomko et al. | |
| 5,699,427 A | 12/1997 | Chow | |
| 5,715,454 A | 2/1998 | Smith | |
| 5,748,738 A | 5/1998 | Bisbee et al. | |
| 5,758,069 A | 5/1998 | Olsen | |
| 5,758,358 A | 5/1998 | Ebbo | |
| 5,781,629 A | 7/1998 | Haber et al. | |
| 5,802,299 A | 9/1998 | Logan et al. | |
| 5,832,091 A | 11/1998 | Tomko et al. | |
| 5,872,848 A | 2/1999 | Romney et al. | |
| 5,887,133 A | 3/1999 | Brown et al. | |
| 5,890,177 A | 3/1999 | Moody et al. | |
| 5,897,643 A | 4/1999 | Matsumoto | |
| 5,898,836 A | 4/1999 | Freivald et al. | |
| 5,937,159 A | 8/1999 | Meyers et al. | |
| 5,948,057 A | 9/1999 | Berger et al. | |
| 5,991,876 A | 11/1999 | Johnson et al. | |
| 5,995,939 A | 11/1999 | Berman et al. | |
| 6,105,012 A | 8/2000 | Chang et al. | |
| 6,185,308 B1* | 2/2001 | Ando et al. | 380/286 |
| 6,199,052 B1 | 3/2001 | Mitty et al. | |
| 6,662,299 B1* | 12/2003 | Price, III | 713/171 |
| 6,678,821 B1 | 1/2004 | Waugh et al. | |
| 7,196,807 B2* | 3/2007 | Goldstone | 358/1.15 |
| 7,266,847 B2* | 9/2007 | Pauker et al. | 726/27 |
| 7,921,292 B1* | 4/2011 | Pauker et al. | 713/171 |
| 2001/0014153 A1* | 8/2001 | Johnson | 380/30 |
| 2001/0014158 A1 | 8/2001 | Baltzley | |
| 2002/0007453 A1 | 1/2002 | Nemovicher | |
| 2002/0023208 A1 | 2/2002 | Jancula | |
| 2002/0023213 A1 | 2/2002 | Walker | |
| 2002/0023220 A1 | 2/2002 | Kaplan | |
| 2002/0059144 A1 | 5/2002 | Meffert et al. | |
| 2002/0126850 A1* | 9/2002 | Allen et al. | 380/277 |
| 2002/0129238 A1 | 9/2002 | Toh et al. | |
| 2002/0144109 A1* | 10/2002 | Benantar et al. | 713/156 |
| 2003/0046362 A1 | 3/2003 | Waugh et al. | |
| 2003/0142364 A1* | 7/2003 | Goldstone | 358/402 |
| 2004/0019780 A1* | 1/2004 | Waugh et al. | 713/152 |
| 2005/0071632 A1* | 3/2005 | Pauker et al. | 713/165 |
| 2005/0138367 A1* | 6/2005 | Paganetti et al. | 713/161 |

FOREIGN PATENT DOCUMENTS

| | | |
|---|---|---|
| EP | 0789361 | 8/1997 |
| EP | 0798619 | 10/1997 |
| EP | 0859488 | 8/1998 |
| EP | 1267516 | 12/2002 |
| JP | 08137938 | 5/1996 |
| WO | WO 98/02968 | 1/1998 |
| WO | WO 9953408 | 10/1999 |
| WO | WO0197089 A | 12/2001 |

OTHER PUBLICATIONS

"PKCS #3: Diffie-Hellman Key-Agreement Standard," RSA Laboratories, RSA Data Security Inc., RSA Laboratories Technical Note, Version 1.4, Nov. 1, 1993.

Irish Times, New Internet Browser has 128-bit encryption security, Sep. 25, 1998, p. 61.

Introduction to SSL, Netscape Communications Corporation, 1998, downloaded from http://developer.netscape.com/tech/security/ssl/howitworks.html.

How SSL Works, Netscape Communications Corporation, 1999, downloaded from http://developer.netscape.com/docs/manuals/security/sslin/contents.htm.

Stallings W: "S/MIME: E-mail gets secure" Byte, McGraw-Hill Inc. St. Peterborough, U. S., vol. 23, No. 7, Jul. 1, 1998, pp. 41-42, XP000774260 ISSN: 0360-5280.

"Enabling Email Confidentiality through the use of Opportunistic Encryption," Garfinkel, MIT Laboratory for Computer Science, ACM International Conference Proceeding Series; vol. 130, Proceedings of the 2003 annual national conference on Digital government research, Digital Government Society of North America, 2003.

"An introduction to Cryptography," Network Associates, Inc. and its Affiliated Companies, PGP, Version 6.5.1, Copyright (c) 1990-1999, http://www.pgpi.org/doc/guide6.5/en/intro/.

"An improved e-mail security protocol," Schneier et al. Computer Security Applications Conference, 1997. Proceedings., 13th Annual, pp. 227-203, Dec. 8-12, 1997.

"OpenPGP Message Format", Callas et al., Network Working Group, RFC 2440, Nov. 1998.

"A Review of the Diffie-Hellman Algorithm and its Use in Secure Internet Protocols," Carts, SANS Institute, InforSec Reading Room, Nov. 5, 2001.

"Internet X.509 public Key Infrastructure Certificate and Certificate Revocation List (CRL) Profile," Houslet et al., Network Working Group, RFC 2180, Apr. 2002.

"An internet key exchange protocol based on public key infrastructure," Jian-ming et al., Journal of Shanghai University, Shanghai University Press, vol. 8, No. 1, SpringerLink, Mar. 2004.

* cited by examiner

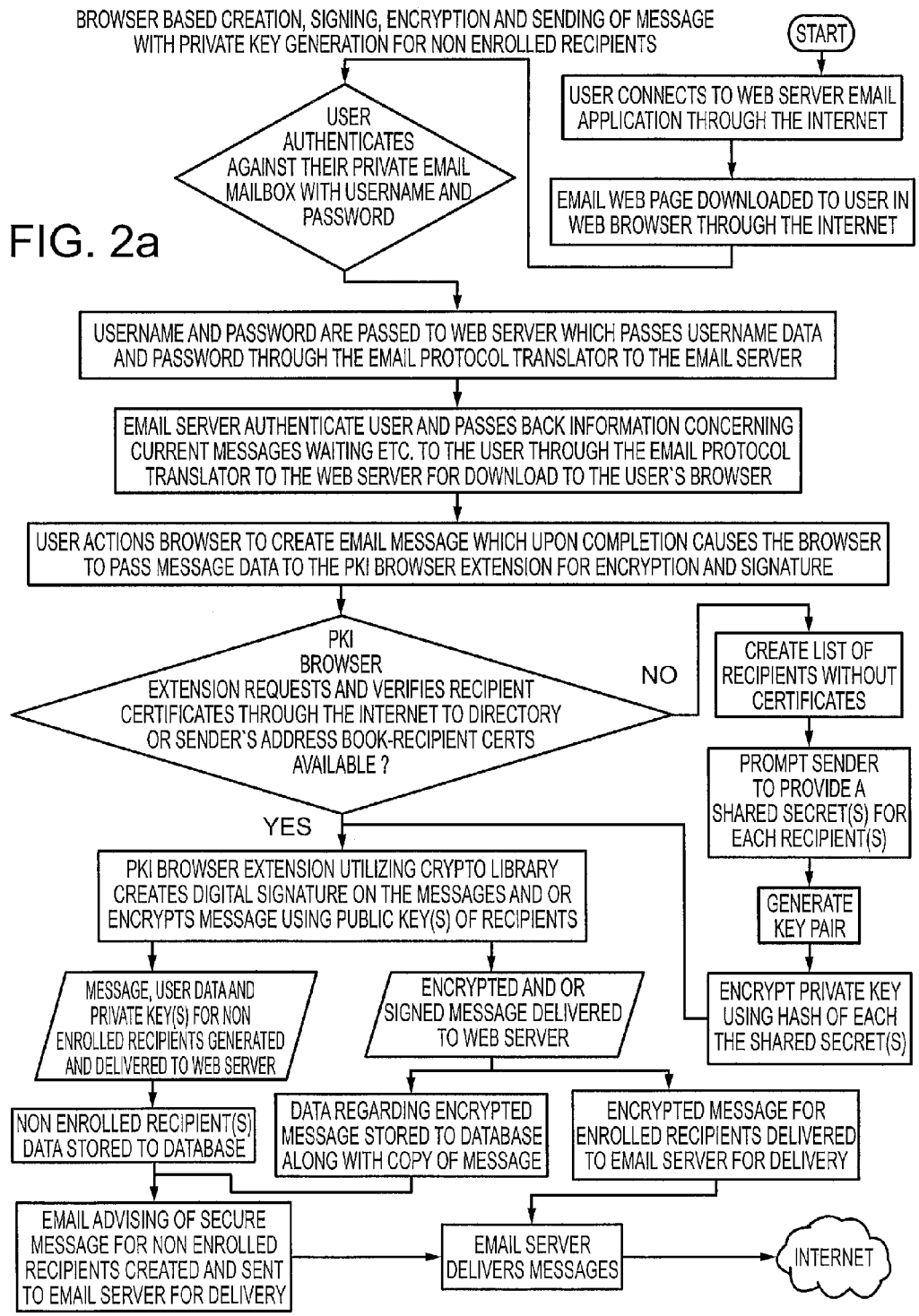

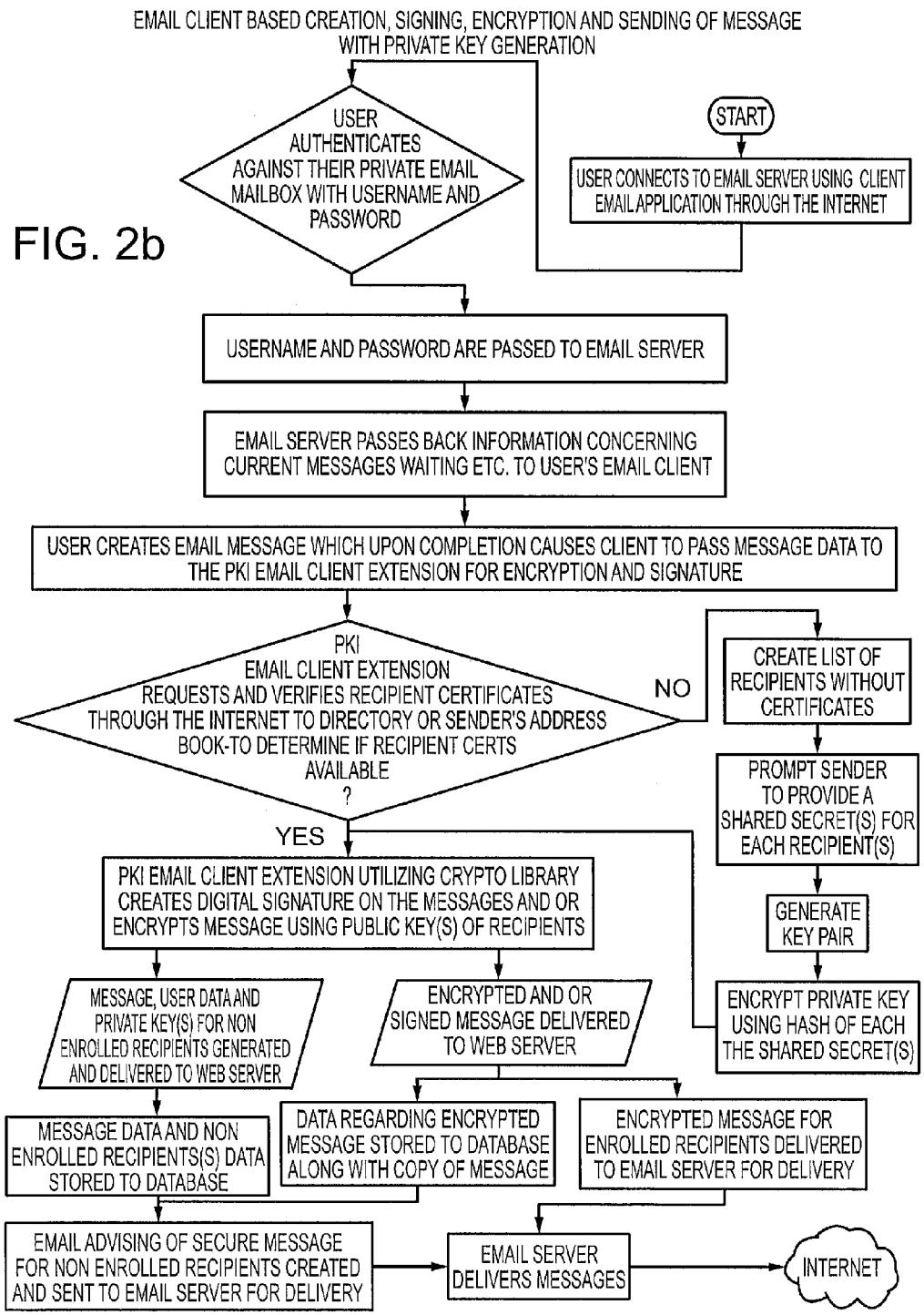

CREATING A SHARED SECRET AND GENERATING A KEY PAIR

SECURE EMAIL

YOU DO NOT HAVE THE SECURITY KEY FOR SOME OF YOUR INTENDED RECIPIENT(S), AND NEED TO CREATE AND ASSIGN A SECURITY QUESTION FOR THE RECIPIENT(S) LISTED BELOW TO ALLOW THEM TO COLLECT THIS MESSAGE.

STEP 1: CREATE A SECURITY QUESTION

SELECT A QUESTION: [-SELECT A QUESTION-]
-OR-
CREATE YOUR OWN: [          ]

ANSWER: [          ]

STEP 2: ASSIGN THE QUESTION

SELECT THE RECIPIENT(S) YOU WOULD LIKE TO ASSIGN THIS SECURITY QUESTION TO. A CHECK MARK WILL APPEAR NEXT TO YOUR RECIPIENT(S) ONCE THE QUESTION HAS BEEN ASSIGNED.

AVAILABLE RECIPIENTS:    SELECTED RECIPIENTS:

doncwaugh@hotmail.com
testuser@hotmail.com

[OK]  [CANCEL]

FIG. 4

RESPONDING TO CHALLENGE QUESTION FOR SHARED SECRET

SECURE EMAIL

PLEASE ANSWER THE FOLLOWING SECURITY QUESTION

IN WHICH CITY/TOWN WAS I BORN?

ANSWER: [          ]

[OK]  [CANCEL]

FIG. 5

SYSTEM, METHOD AND COMPUTER PRODUCT FOR SENDING ENCRYPTED MESSAGES TO RECIPIENTS WHERE THE SENDER DOES NOT POSSESS THE CREDENTIALS OF THE RECIPIENT

FIELD OF INVENTION

This invention relates generally to the secure delivery and receipt of data using public key cryptography (PKC); more particularly, to the secure delivery and receipt of encrypted messages and Secure Multipurpose Internet Mail Extension (S/MIME) encrypted messages where the sender does not possess the credentials of the recipient either because the recipient is not enrolled in a Public Key Infrastructure (PKI) or the recipient has not provided their public key to the sender.

BACKGROUND OF THE INVENTION

Several discoveries have been made to address the need for securing messages between a sender and receiver. One such discovery being the Diffie-Hellman algorithm and the Rivest Shamir Adleman public key crypto system discovered in the mid 1970s. The significance of these discoveries is that they have become standards on which present encryption systems are built.

The Diffie-Hellman algorithm is especially suited to secure real time communications. The Diffie-Hellman algorithm requires the participation of both the sender and receiver. To execute, the two participants choose two numbers which in turn are used in conjunction with secret numbers which are correspondingly secret to each of the two participants to derive a third number which is exchanged between the two participants. The exchanged numbers are then used in a process to encrypt the messages between the two participants and then to decrypt the messages. This method therefore requires the active participation of the recipient in order to send a secure message. As a consequence, the system is best suited for only two participants in the message, and is not suited for multiple participants. Furthermore although the system secures the confidentiality of the message satisfactorily it does not ensure the authenticity of the message or the sender in terms of what is known as a "digital signature". As such, the Diffie-Hellman algorithm is predominantly used to secure the real time communication sessions between a sender and a receiver over a network.

The Rivest Shamir Adleman (RSA) public key crypto system, while inspired by the Diffie-Helman algorithm, developed, a method that 1.) does not require the active participation of the recipient, 2.) allows for more than two participants in a message, and 3.) established a framework to provide authenticity of both the sender and of the message itself in addition to securing the message between the sender and the recipient(s).

Securing messages between senders and recipients can be accomplished in an infinite number of ways. To secure email, arguably the most widely deployed application on the Internet, the S/MIME standard was developed in the late 1990s. While there are proprietary methods for securing email messages such as those developed by organizations such as PGP, Hushmail, Zixit, Ziplip etc., S/MIME has become the dominant world standard to secure email communications.

The S/MIME protocol was established by RSA Data Security and other software vendors in 1995. The goal of S/MIME was to provide message integrity, authentication, non-repudiation and privacy of email messages through the use of Public Key Infrastructure ("PKI") encryption and digital signature technologies. Email applications that support S/MIME assure that third parties, such as network administrators and ISPs, cannot intercept, read or alter messages. S/MIME functions primarily by building security on top of the common MIME (Multipurpose Internet Mail Extension) protocol, which defines the manner in which an electronic message is organized, as well as the manner in which the electronic message is supported by most email applications.

Currently, the most popular version of S/MIME is V3 (version three), which was introduced in July, 1999. Further information on S/MIME standardization and related documents can be found on the Internet Mail Consortium web site and the IETF S/MIME working group web site.

The S/MIME V3 Standard consists generally of the following protocols:
  Cryptographic Message Syntax (RFC 2630);
  S/MIME Version 3 Message Specification (RFC 2633); and
  S/MIME Version 3 Certificate Handling (RFC 2632).

S/MIME and similar secure message systems rely on PKC to invoke security. With S/MIME security, a MIME message is secured by digitally signing the message which is conducted by encrypting a message digest hash with the private key of the sender. This is what is known as a digital signature. Optionally, the message content with the digital signature is encrypted using the public key of the recipient. The encrypted message and digital signature comprise the S/MIME email message that is then sent to the recipient. Upon receiving the message, the recipient's private key is used to decrypt the message. The recipient re-computes the message digest hash from the decrypted message and uses the public key of the sender to decrypt the original message digest hash (the digital signature) and compares the two hashes. If the two hashes are the same, the recipient has validation of the authencity of the sender and of the integrity of the message. Consequently, S/MIME and similar secure message systems generally require that both the sender and the recipient(s) be enrolled in a PKC system and that the public keys of each be accessible in order for the message to be secured and for the sender and message to be authenticated. As such, if the recipient is not enrolled in a PKI, or the sender does not have access to the recipient's(s') key(s), the sender will not be able to send a secure message to the recipient(s).

What is needed therefore is a system, computer program and method for delivering encrypted messages to recipient(s) where the sender does not possess the credentials of the recipient(s) or some subset thereof. What is further needed is the aforesaid system, computer program and method that can access or generate message encryption keys, which can be used by the sender to ensure the privacy of the message for the recipient. What is still further needed is the aforesaid system, computer program and method that is easily deployed in either a browser or on a client application provided at the network-connected devices themselves. What is also needed is a web-based or client based system, computer program and method whereby the encryption persists throughout the communication and storage of data. What is also needed is a web-based or client-based system, computer program and method whereby the message decryption key is stored securely and accessed securely by the recipient in order to decrypt the message.

SUMMARY OF THE INVENTION

The system, method and computer program of the present invention enables users to create and send encrypted email or other encrypted messages either through a browser or through client software without the need to have the certificate(s) or public key(s) of the recipient(s). From a sender usability perspective this eliminates the sender's inability to send secure messages when a recipient is not enrolled in a PKI and therefore does not possess a PKI certificate or when the recipient's certificate is not in the possession of the sender.

In another aspect of the present invention permits recipients to access private PKC based encrypted messages without the need to be enrolled in a PKI.

In another aspect of the present invention permits recipients to access PKC keys over the Internet from any network-connected device. This eliminates the need for location specific private key and digital certificate storage.

BRIEF DESCRIPTION OF THE DRAWINGS

A detailed description of the preferred embodiment(s) is(are) provided herein below by way of example only and with reference to the following drawings, in which:

FIG. 2a is a flow chart that depicts the steps in creating, signing, and encrypting a secure message and the generation of security keys for non-enrolled recipients using browser based messaging, in accordance with one aspect of the method of the present invention.

FIG. 2b is a flow chart that depicts the steps in creating, signing, and encrypting a message and the generation of security keys for non-enrolled recipients using client based messaging, in accordance with another aspect of the method of the present invention.

FIG. 4 depicts a possible user interface for creating a shared secret to secure a message.

FIG. 5 depicts a possible user interface for responding to a challenge question to provide a shared secret.

Figure 1A:
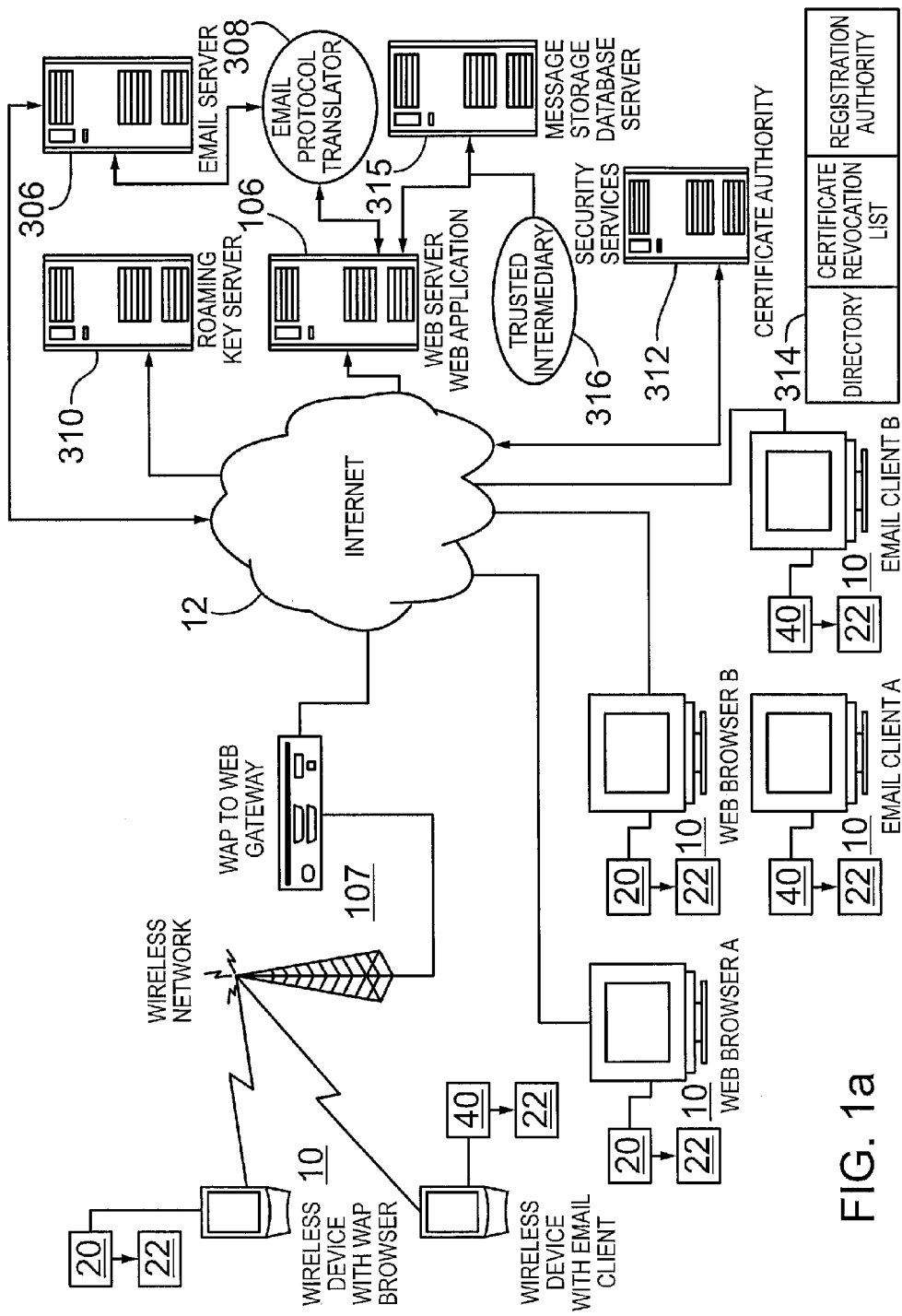
FIG. 1a is a schematic System Architectural Component Diagram of the secure message system of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

As illustrated in FIG. 1, at least one known network-connected device 10 is provided. Network-connected devices 10 may consist of a number of digital devices that provide connectivity to a network of computers. For example, the network-connected device 10 may consist of a known personal computer or a known WAP device, cell phone, PDA or the like.

The network-connected device 10 is connected to the Internet 12 in a manner that is known. Specifically in relation to FIG. 1, the connection of a network-connected device 10 that is a known WAP device to the Internet is illustrated, whereby a known WAP to WEB gateway 107 is provided, in a manner that is also known.

Figure 1B:
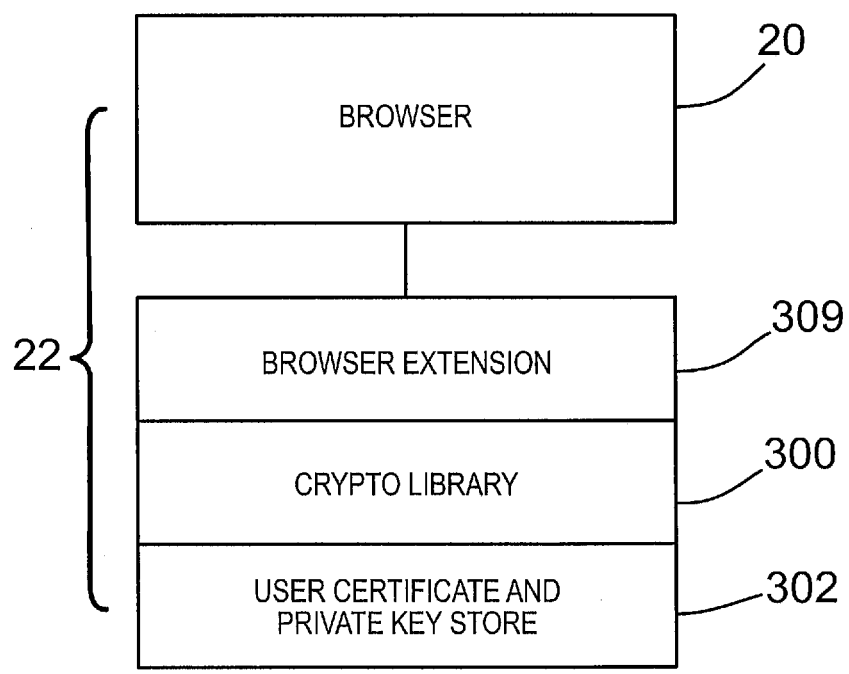
FIG. 1b is a program resource chart illustrating the resources of the application of the present invention, in one embodiment thereof.

Also as shown in FIG. 1a, each of the network-connected devices 10 may include a known computerized device, which includes a browser 20 and/or client application 40. The browser can be a standard Internet based browser, such as Netscape's NAVIGATOR™ or Microsoft's INTERNET EXPLORER™ or a known mini browser for wireless devices such as cell phones or PDAs. Client application 40 can be a known email program such as Microsoft's OUTLOOK™, OUTLOOK EXPRESS™, LOTUS NOTES™, Novell's GROUPWISE™, EUDORA™ or another known email program for wireless devices such as cell phones or PDAs, including those commonly bundled in such devices as part of the devices' operating system or is distributed as a separate component. The client application 40 can also be a custom client used to create secure messages.

Each of the network-connected devices 10 also includes the application 22 of the present invention, which consists of the computer program of the present invention. Certain attributes of this application 22, in particular the manner in which it permits Public Key Cryptography (PKC) enabled communications over wired and wireless networks is disclosed in U.S. Pat. No. 6,678,821 issued to Echoworx Corporation and the Co-Pending patent application Ser. Nos. 10/178,224 and 10/379,528 (the "patent" or the "Co-Pending patent applications", as applicable).

As particularized below, the application 22 includes a PKC utility (not shown). In one particular embodiment of the application, 22, illustrated in FIG. 1b, the application 22 consists of a specialized browser extension 309 or plug-in. Specifically in this particular embodiment of the invention, the application 22 and the browser 20 inter-operate by means of, for example, customized HTML tags. As opposed to using an intermediate host server, or a relatively large computer program (as is the case with prior art technologies), application 22 preferably provides the necessary resources to enable the network-connected device 10, as particularized below, to function with any third party PKI system, including for example, ENTRUST™, MICROSOFT™, BALTIMORE™, RSA™ and so forth. It should also be understood that the functions of the application 22 described herein can also be provided as an "ACTIVE X OBJECT" in a manner that is known, or integrated directly into a browser.

Figure 1C:
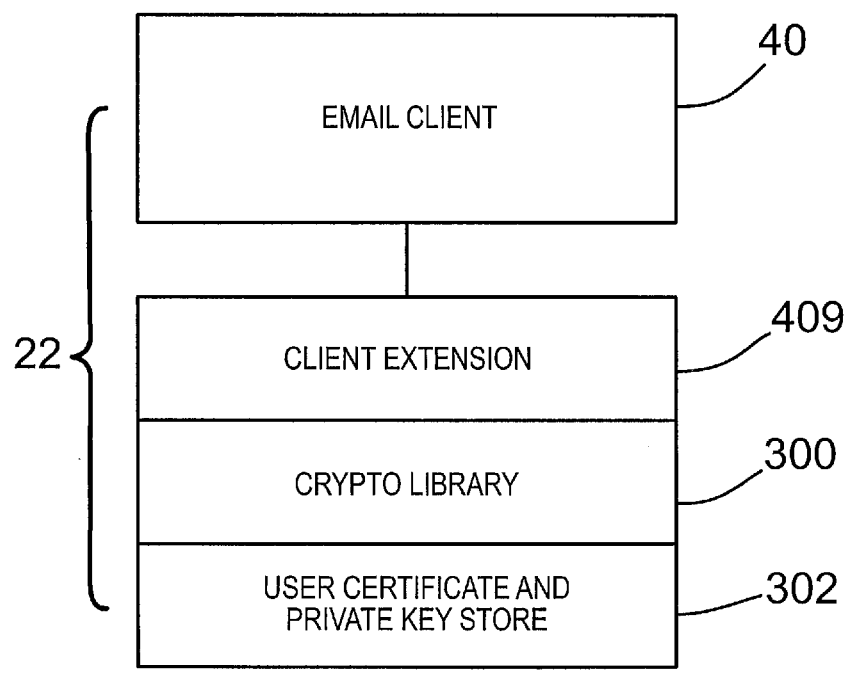
FIG. 1c is a program resource chart illustrating the resources of the application of the present invention, in another embodiment thereof.

In another embodiment of application 22, illustrated in FIG. 1c, the application 22 consists of a client extension 409 or plug-in is provided in a manner that is known. Specifically, the application 22 and the client application 40 inter-operate by means of, for example, customized programming specific to the client application 40. As opposed to using an intermediate host server, or a relatively large computer program (as is the case with prior art technologies), application 22 (in this particular embodiment of the invention also) preferably provides the necessary resources on the network-connected device 10, as particularized below, to function with any third party PKI system, including for example, ENTRUST™, MICROSOFT™, BALTIMORE™, RSA™ and so forth. It should also be understood that the functions of application 22 described herein can also be integrated directly into the client application 40.

Application 22 functions as a cryptographic utility, provided in the manner described in the patent and Co-Pending patent applications, such that the application 22 is adapted to perform at the network-connected device 10 one or more of a series of cryptographic operations, including but not limited to:

- Digital signature of data in S/MIME format;
- Encryption of data in S/MIME format;
- Digital signature of data in form fields;
- Encryption of data in form fields;
- Decryption of data in form fields;
- Verification of signature of data in form fields;
- Digital signature and encryption of data in form fields;
- Verification of Digital signature and decryption of data in form fields;
- Digital signature of full pages;
- Verification of digital signature of full pages;
- Encryption of full pages;
- Decryption of full pages; and
- File attachment encryption and signing.

Specifically, application 22 includes a Crypto Library 300, provided in a manner that is known. In one particular embodiment of the present invention, the application 22 also includes a User Certificate and Private Key 302 which contains the cryptographic data required to encrypt and/or digitally sign data included in data communications (including email) contemplated by the present invention. For example, in one particular implementation of the present invention, namely one whereby Microsoft software provides the Security Services 312, the .PFX or DER (Distinguished encoding rules ASN.1) encoded X509 certificate files required to authenticate the sender, or encrypt data for the recipient, are downloaded to the network-connected device 10 or are generated by the network-connected device 10. The .PFX file is an encrypted file that is used to access the user credentials and private key required to process cryptographic operations. The PFX file is formatted based on the PKCS12 standard. The DER encoded X509 certificate file provides the public key and certificates of the recipient.

Security Services 312 should be understood as a general term describing a known PKI infrastructure. PKI infrastructures can vary as to the particulars of their architecture, or their hardware or software components. Typically, however, a PKI infrastructure consists of the components illustrated in FIG. 1*a*: a Certificate Authority for issuing and certifying certificates for enrolled users; a Lightweight Directory Access Protocol (or "LDAP") for storing the public key and certificates of enrolled users; and a Certificate Revocation List (or "CRL") for revoking certificates. In another aspect of Security Services 12 also illustrated in FIG. 1*a*, a Roaming Key Server (or "RKS") is used for storing private keys of enrolled users.

As stated earlier, application 22 of the present invention includes a PKC extension, and specifically a browser extension 309 or the email client extension 409 described below. The PKC extension permits the encryption and decryption of data communications (including email) in a browser or email client, as particularized herein. This has the advantage of broad-based deployment as browser technology and email software is commonplace. This also has the advantage of deployment across wireless and wired networks as the application 22 of the present invention, including the browser or client extension, can be associated with a web browser or a WAP browser, as shown in FIG. 1*a*. In addition, the invention disclosed herein requires only a browser or email client and the associated application 22 at each network-connected device 10 rather than a relatively thick client at each network-connected device 10 which reduces the resources required at each such device to provide PKI functionality. Also, as further explained below, in accordance with the present invention, secure encrypted communications are possible without the need to possess the certificates and public key of the recipients, resources usually required to send fully encrypted messages such as S/MIME messages on the network-connected device 10.

Each of the browser extension 309 and the email client extension 409 is generally reduced to code in a manner known by a skilled programmer. However, it is desirable for the browser extension 309 or client extension 409 of the present invention to have a number of attributes. First, as a result of the method of the present invention detailed below, it is desirable that the browser extension 304 and client extension 409 be able to generate a public key pair and to secure the private key based on a secret that is shared between the sender and the recipient such that the password is used to encrypt the private key. Second, the key generation, security, and the encryption and decryption of data described herein involve a potential security risk if the browser extension 309 or client extension 409 is not designed properly. Specifically, it is necessary to ensure that browser memory is (in the case of the browser extension 309) utilized in the course of the cryptographic operations such that security is not compromised. In one particular embodiment of the present invention, this is achieved by using the "TEMP" memory space of the browser 20 or client application 40, in a manner known by a skilled programmer. Third, the browser extension 309 or client extension 409 further includes a CLEANUP ROUTINE or equivalent provided in a manner that is known that eliminates any remnants from the memory associated with the browser, email client, or otherwise with the network-connected device 10, of either the message, the user credential or private key that is part of the User Certificate and Private Key Store 302, in order to maintain confidentiality. Specifically, for example in relation to the browser extension 309, the browser extension 309 is configured such that it will not store a copy of the email in the browser cache. In addition, the browser extension 309 or client extension 409 will delete any copies of any attachments associated with a secure message.

As stated earlier, the present invention also contemplates that the browser extension 309 or client extension 409 provides means to establish a shared secret that will be used by the browser extension 309 or the client extension 409 to encrypt the private key corresponding to the public key that is used to encrypt the message or to authenticate a non-enrolled recipient to a trusted intermediary. This particular aspect of the present invention is illustrated in FIGS. 4 and 5.

In addition, the present invention contemplates that the browser extension 309 and the client extension 409 facilitate the notification and delivery of secure messages to a recipient not enrolled in a PKI. More particularly, the browser extension 309 or the client extension 40 is adapted to permit the non-enrolled recipient to respond to a request for a shared secret which upon successful provision thereof releases the private key or authenticate the non-enrolled recipient (illustrated in FIG. 1*a*) to a trusted intermediary in order to decrypt and view the secure message.

Also connected to the Internet 12, is a web server 106 that is provided using known hardware and software utilities so as to enable provisioning of the network-connected device 10, in a manner that is known. The web server 106 includes a web application 16. The web application 16 is adapted to execute the operations, including PKI operations, referenced below.

The system, computer program and method of the present invention are directed to:

Creating, encrypting and delivering secured messages including S/MIME compliant email messages to an email server or a message storage/database server;

Retrieving and deciphering secured messages, including S/MIME compliant email messages, from an email server or a message storage/database server; and Creating, securing and delivering recipient data and private key(s) to a secure storage server.

In order to achieve the foregoing, the system, computer program and method of the present invention rely on aspects of the patent and the Co-Pending patent applications for engaging in PKI enabled transactions. Specifically, email messages are created and delivered in accordance with the present invention in a manner that is analogous with the "POSTING DATA ON A SECURE BASIS" and "SECURE DELIVERY OF S/MIME ENCRYPTED DATA" described in the Co-Pending patent applications. An email message is retrieved and deciphered in the manner described under the heading "RETRIEVING OF DATA ON A SECURE BASIS" and the "SECURE RECEIPT OF S/MIME ENCRYPTED DATA" also described ID the Co-Pending patent applications.

As illustrated in FIG. 1*a*, one aspect of the system of the present invention also includes a known email server or message server 306. The email server or message server 306 sends and receives emails in a manner that is well known. The email server or message server 306 is provided by known hardware and software utilities. Also as illustrated in FIG. 1*a*, one aspect of the system of the present invention includes an email protocol translator 308. The email protocol translator 308 is a known utility which permits the web server 106 and the email server or message server 306 to communicate by translating messages sent by the web server 106 to the particular email protocol understood by the email server or message server 306 such as for example POP3 or IMAP4.

Also as illustrated in FIG. 1*a*, another aspect of the system of the present invention includes a known message storage/database server 315. The message storage/database server 315 stores and delivers user credentials and secure messages in a manner that is well known. The message storage/database server 315 is also provided by known hardware and software utilities.

The web server 106, the web application 16, and the email protocol translator 308 are used to support browser-based encryption and/or decryption of S/MIME messages in the browser as described in the Co-Pending patent applications.

The roaming key server 310 is used to store and provision private keys to enrolled users (supporting user mobility) and private message keys for non-enrolled users for the encryption and/or decryption of non-enrolled users for the encryption and/or decryption of S/MIME messages in the browser as described in the Co-Pending patent applications. Normally, private keys are stored on users' desktop computers for use with email client software. However, browser based email allows the user to send or retrieve email from any device with a standard browser. The roaming key server 310 stores and provisions private message keys for use by non-enrolled recipients for decrypting secure messages (as particularized below).

In one particular embodiment of the invention, the email server 306 or the message storage/database server 315 is used to store encrypted messages for non-enrolled recipients. In either case, the message storage/database server 315 can be used to store the shared secret for authenticating non-enrolled recipients.

The trusted intermediary 316 cooperates with the web server 106 and the web application 16 to authenticate non-enrolled recipients, and in one embodiment of the present invention, upon provision by the recipient of the correct shared secret, decrypt the message and securely deliver the message to the non-enrolled recipient's browser.

The Certificate Authority that is part of the Security Services 312, in one particular embodiment of the present invention, is used to generate "message keys" for non-enrolled recipients.

The Directory 314 illustrated in FIG. 1*a*, which is part of the Certificate Authority, is used to store public keys of enrolled recipients and to search for the recipient's public keys for encrypting messages.

Browser Based Creating, Signing, Encrypting and Sending Messages with Private Key Generation for Non Enrolled Recipients FIG. 2*a* illustrates browser based creation and delivery of secure messages for recipients who are not enrolled in a PKI in accordance with the present invention.

A user associated with a network-connected device 10 who desires to create and send an email on a secure basis (the "Sender") requests a page on the web server 106 using the browser 20 loaded on the network-connected device 10.

The web server 106, and specifically in co-operation with the web application 16 loaded on the web server 106, responds to the network-connected device 10 by presenting a web page that is a web form requesting that the user associated with the network-device 10 provide authentication in order to gain access to the web application 16, and specifically a secure message application (not shown) that is included in the web application 16.

The Sender supplies information in the authentication form fields (such as username and password) on the web page and concludes with submitting the form, typically by pressing a 'SUBMIT' button or equivalent.

The authentication credentials are passed to the web server 106. The web server 106 in turn delivers the authentication credentials to the email server or message server 306 via the email protocol translator 308 in one embodiment of the application or authenticates the user credentials from the message storage/database server 315 in alternate embodiment of the application.

Specifically in accordance with the aspect of the present invention whereby the roaming key server 310 is used to access the User Certificate and Private Key by mean of the User Certificate and Private Key Store 302, the web server 106 also transfers the user credentials to the roaming key server 310.

The email server 306 or message storage/database server 315 authenticates the Sender and then passes back, through the email protocol translator 308, message waiting lists and other pertinent information about the Sender's email account to the web server 106 for display in the Sender's browser 20 and establishes an email session typically using a cookie, in a manner that is known.

The web server 106 authenticates the Sender for the message storage/database server 315 and then passes back message waiting lists and other pertinent information about the Sender's account to the web server 106 for display in the Sender's browser 20 and establishes a session typically using a cookie, in a manner that is known.

Again, in accordance with the aspect of the present invention utilizing the roaming key server 310, the roaming key server 310 authenticates the Sender and transmits the Sender's private key and certificate through the web server 106 to the browser extension 309. In accordance with the aspect of the present invention whereby the User Certificate and Private Key Store 302 resides on the network-connected device 10, the private key and certificate is accessed by the browser extension 309.

The Sender prepares a message by completing the appropriate fields of a web form referred to, including for example the message subject, body and intended recipient's fields. In one particular embodiment of the present invention, the application 22 also provides the recipients' shared secret(s).

The Security Services 312 is contacted whereby the recipient's(s') public keys and certificates are verified and retrieved from the associated directory 314 or from the sender address book stored on the message storage/database server 315. In the event that the recipient(s) public key(s) and certificate(s) cannot be retrieved from either "publicly accessible" location, application 22 of the present invention is invoked to create a shared secret and generate a PKC key pair by application 22 to secure the message for non-enrolled recipients.

It should be understood that the present invention refers in various places to "non-enrolled recipients". What is meant is that the sender does not possess, or have access to, the PKI credentials of the recipient, whether the recipient has been enrolled in a PKI or not. In other words, "non-enrolled recipients" also means "non-credentialed recipients".

The private key(s) of the key pair is encrypted in a manner that is well known using the shared secret(s) as the pass phrase which is secured in a manner which is as known. The encrypted private key(s) for non enrolled recipients is (are) stored on the message storage/database server 315 along with recipient information including the shared secret question which the recipient must answer FIG. 5. Private key(s) storage is not limited to the message storage/database server 315 and could use the roaming key server 310 or email server or message server 306 as alternate locations for private key storage.

The message form data is passed to the application 22, including the browser extension 309, for signing and encrypting the message and any attachments using the private key of the Sender and the public key(s) of the recipient(s), and in one embodiment of the invention to form an S/MIME compliant email message.

The message is returned to the browser 20 and sent from the browser 20 to the web server 106, and using the email protocol translator 308 to the email server or message server 306 for forwarding to the identified recipients in one embodiment. In another embodiment of the present invention the secured message for non-enrolled recipients is stored to the message storage/database server 315 and an email advisory is generated by the web application 16 and sent to the non-enrolled recipients advising of the secure message waiting and providing instructions on how to retrieve the secure message.

Client Based Creating, Signing, Encrypting and Sending Messages with Private Key Generation for Non Enrolled Recipients FIG. 2a illustrates client based creation and delivery of secure messages for recipients who are not enrolled in a PKI in accordance with the present invention.

A user associated with a network-connected device 10 who desires to create and send a message on a secure basis (the "Sender") invokes the client application 40 (as stated earlier, consisting of a known communication utility such as an email program) loaded on the network-connected device 10.

The Sender supplies authentication information (such as a username and password) and concludes with submitting the form, typically by pressing a 'SUBMIT' button or equivalent. Often email client programs are set up such that user authentication is configured in the email client program to automate the authentication process such that it does not require user intervention. The authentication credentials are passed to the email server or message server 306.

The email server or message server 306 authenticates the Sender and then passes back message waiting lists and other pertinent information about the Sender's email account for display in the Sender's client application 40 in a manner that is known.

The Sender prepares a message by completing the appropriate fields of the email message from referred to, including for example the message subject, body and intended recipient (s) fields.

Security Services 312 is contacted whereby the recipient's (s') public keys and certificates are verified and retrieved from the associated directory 314 or from the sender's address book stored on the communication utility consisting of the email client program 40. In the event that the recipient(s) public key(s) and certificate(s) cannot be retrieved from either location, application 22 of the present invention is invoked to create a shared secret as illustrated in FIGS. 4 and 5 to generate a PKC key pair to secure the message for non-enrolled recipients.

The private key(s) of the key pair are encrypted in a manner that is well known using the shared secret(s) as the pass phrase. The encrypted private key(s) for non enrolled recipients is (are) stored on the message storage/database server 315 along with recipient information including the shared secret question which the recipient must answer as illustrated in FIG. 5. Private key(s) storage is not limited to the message storage/database server 315 and could use the Roaming Key Server 310 or the email server or message server 306 as alternate locations for private key storage.

The message form data is passed to the application 22, including the email client extension 409, for signing and encrypting the message and any attachments using the private key of the Sender and the public key(s) of the Recipient(s), and in one embodiment of the invention to form an S/MIME compliant email message.

The message is sent from the client to the email server or message server 306 for forwarding to the identified recipients in one embodiment. In another embodiment of the present invention the secured message for non-enrolled recipients is stored to the message storage/database server 315 and an email advisory is generated by the web application 16 and sent to the non-enrolled recipients advising of the secure message waiting and providing instructions on how to retrieve same.

Figure 3A:
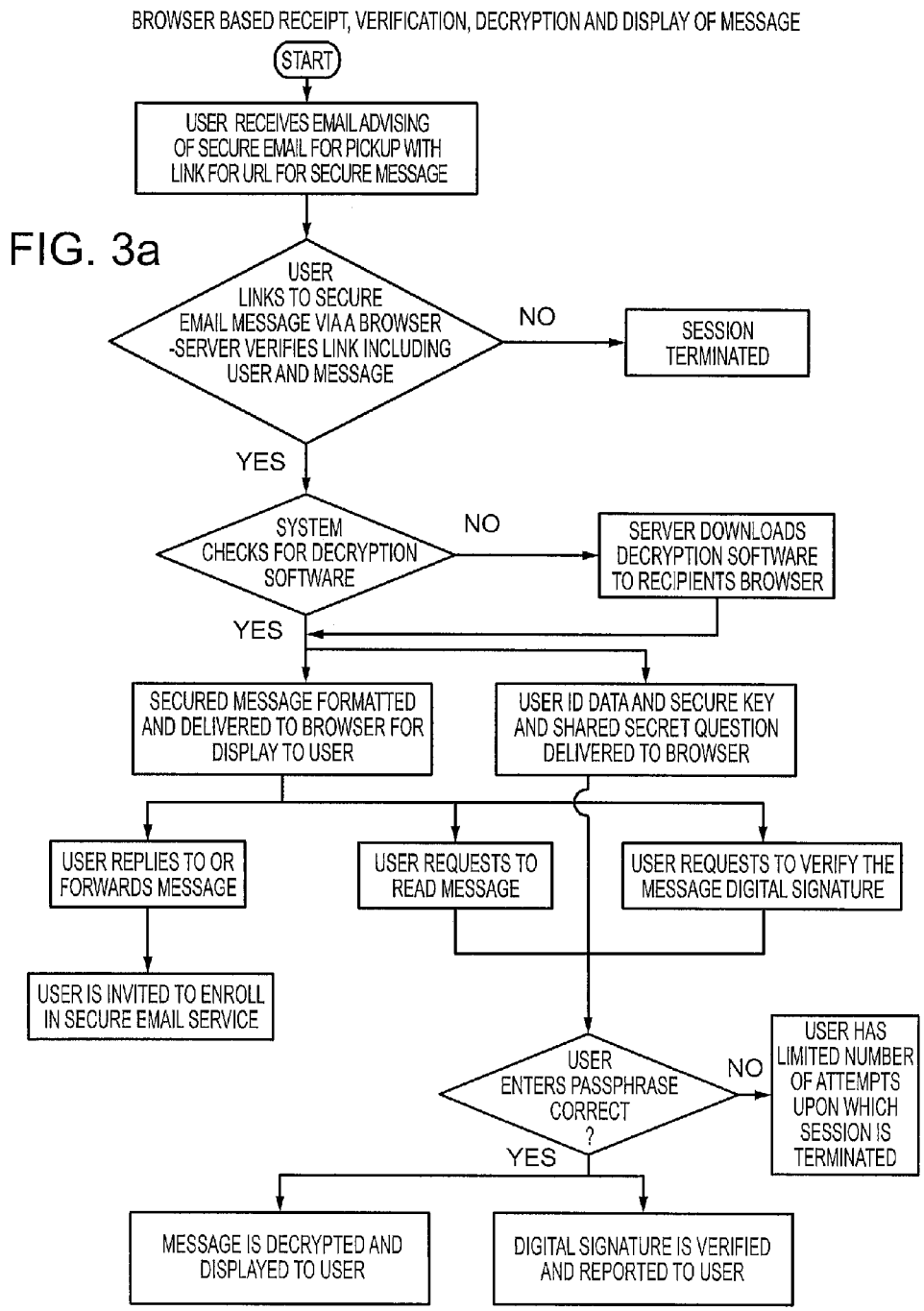
FIG. 3a is a flow chart that depicts the steps for receiving, verifying and decrypting an encrypted message by user who is not enrolled in a PKI using a browser.

Browser Based Retrieving and Decrypting an Encrypted Message from an Email or Message by Non-Enrolled Recipients FIG. 3a illustrates browser based receipt, verification, decryption and display of an encrypted message from an email server or message server 306 or message storage/database server 315 in accordance with the present invention.

A non-enrolled user associated with a network-connected device 10 who desires to display an encrypted message or S/MIME email that they have received on a secure basis (the "Recipient") requests a page from the web application 16 using the browser 20 loaded on the network-connected device 10.

The web application 16 detects if the browser extension 309 is available on the network-connected device 10. If the browser extension 309 is not available, the web application 16 automatically downloads and installs the browser extension 309.

When the browser extension 309 is available on the network-connected device 10 the recipient's authentication credentials are passed to the browser extension 309 in accordance with the aspect of the present invention whereby message storage/database server 315 or in another embodiment, the roaming key server 310 is used to store the non-enrolled User's Private Key Store 302 which then downloads a copy of the encrypted private key to the browser extension 309, and for non-enrolled users the question associated with the shared secret pass phrase.

The browser extension 309 requests the non-enrolled Recipient to provide authentication and for an answer to the shared secret question, in order to decrypt and display the encrypted message or S/MIME email message.

The Recipient supplies password or shared secret information in response to the authentication request (FIG. 5) to the browser extension 309 and concludes with submitting the form) typically by pressing a 'SUBMIT' button or equivalent.

The authentication credentials are passed to the browser extension 309 in accordance with this aspect of the present invention.

The application 22 authenticates against its User Certificate and Private Key Store 302 and if the provided pass phrase is correct, the private key is released to the browser extension 309 component thereof where upon the message signature can be verified and the message decrypted for display in the Recipient's browser 20.

Figure 7A:
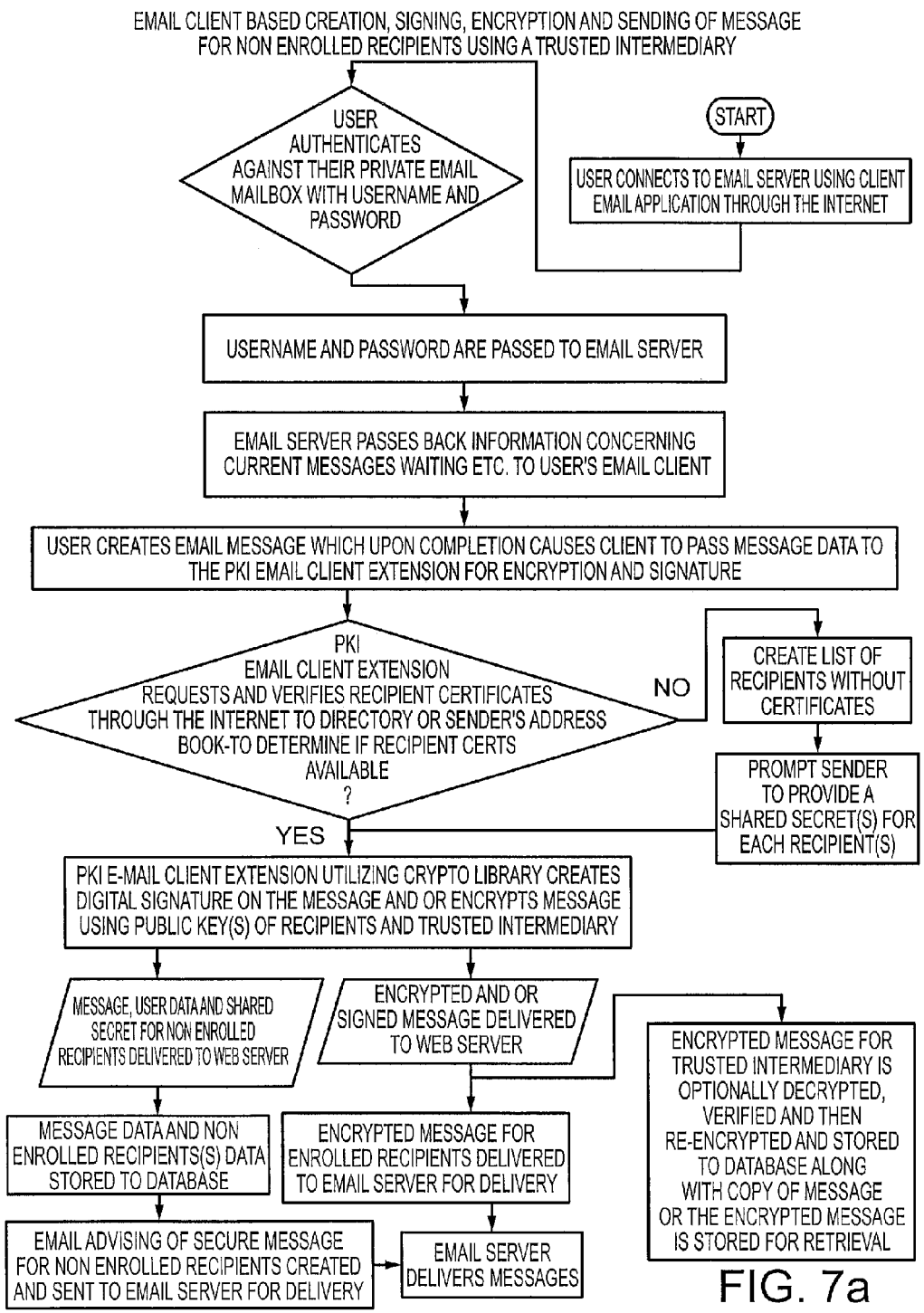
FIG. 7a is a flow chart that depicts the steps in creating, signing, and encrypting a message for non-enrolled recipients using client based messaging and a trusted intermediary.
Figure 7B:
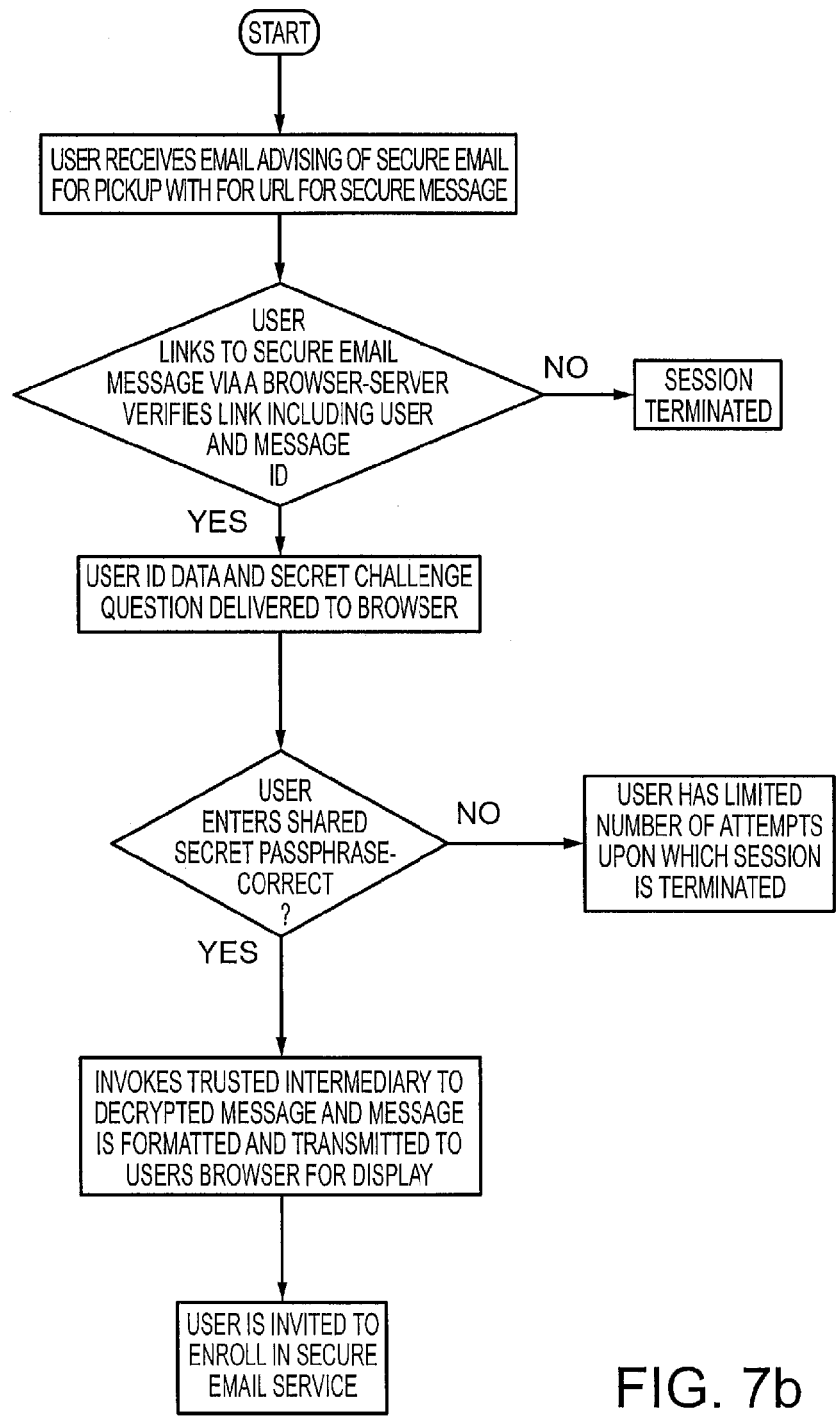
FIG. 7b is a flow chart that depicts the steps for retrieving and verifying an encrypted message by user who is not enrolled in a PKI using a browser or client and a trusted intermediary.

Client Based Creating, Signing, Encrypting and Sending Messages for Non Enrolled Recipients Using a Trusted Intermediary FIG. 7a illustrates client based creation and delivery of secure messages for recipients who are not enrolled in a PKI using a trusted intermediary 316 in accordance with the present invention.

A user associated with a network-connected device 10 who desires to create and send a message on a secure basis (the "Sender") invokes a client program loaded on the network-connected device 10. In a preferred embodiment of the present invention the client program would be an email client program such as Microsoft OUTLOOK EXPRESS™.

The Sender supplies authentication information (such as username and password) and concludes with submitting the form, typically by pressing a 'SUBMIT' button or equivalent. Often email client programs are set up such that user authentication is configured in the email client to automate the authentication process such that it does not require user intervention. The authentication credentials are passed to the email server or message server 306.

The email server or message server 306 authenticates the Sender and then passes back, message waiting lists and other pertinent information about the Sender's email account for display in the Sender's email client 40 in a manner that is known.

The Sender prepares a message by completing the appropriate fields of the email client email form referred to, including for example the message subject, body and intended recipients fields.

The Security Services 312 is contacted whereby the recipient's(s') public keys and certificates are verified and retrieved from the associated directory 314 or from the sender's address book stored on the email client 40. In the event that the recipient(s) public key(s) and certificate(s) cannot be retrieved from either location, application 22 of the present invention is invoked to create a shared secret (FIGS. 4 and 5) and retrieves the key pair of the trusted intermediary 316 to secure the message for non-enrolled recipients.

The recipient information for non-enrolled recipients including the shared secret question which the recipient must answer (FIG. 5) is (are) stored on the message storage/database server 315.

The message form data is passed to the application 22, including the email client extension 409, for signing and encrypting the message and any attachments using the private key of the Sender and the public key(s) of the Recipient(s) and the trusted intermediary 316 for non enrolled recipients, in one embodiment of the invention to form an S/MIME compliant email message.

The message is sent from the client to the email server or message server 306 for forwarding to the identified recipients in one embodiment. In another embodiment of the present invention the secured message for non-enrolled recipients is stored to the message storage/database server 315 and an email advisory is generated by the web application 16 and sent to the non-enrolled recipients advising of the secure message waiting providing instructions on how to retrieve the secure message. In another embodiment, and for reasons of scaleability and efficiency of the encryption algorithm, the secured message for non-enrolled recipients is decrypted by the trusted intermediary 315, the digital signature is verified, and the message is re-encrypted using a symmetric key unique to the trusted intermediary 316 and stored to the message storage/database server 315 with a copy of the original message stored to a message archive.

Figure 3B:
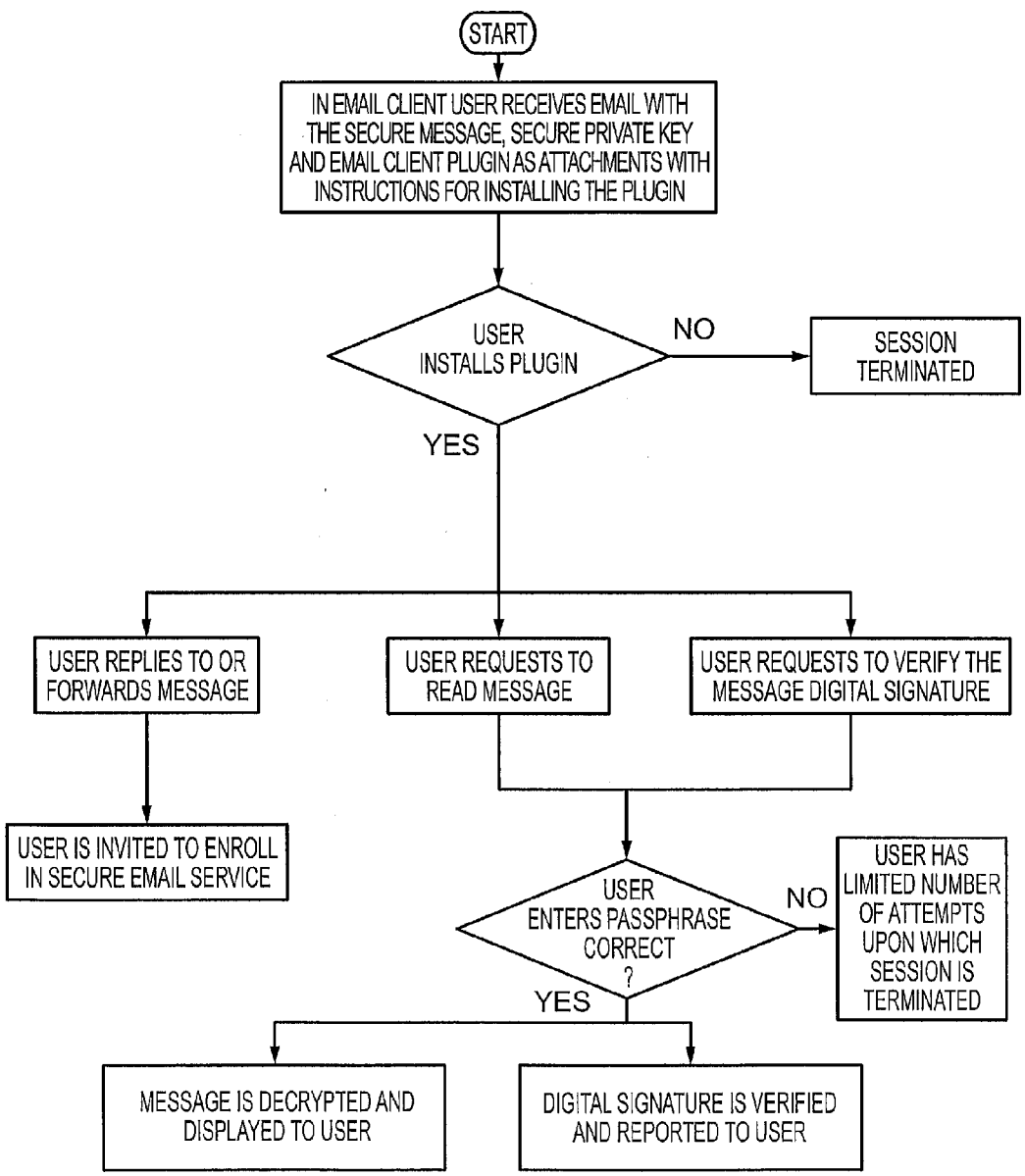
FIG. 3b is a flow chart that depicts the steps for receiving, verifying and decrypting an encrypted message by users who are not enrolled in a PKI using a client.

Client Based Retrieving and Decrypting an Encrypted Message from an Email or Message by Non Enrolled Recipients FIG. 3b illustrates client based receipt, verification, decryption and display of an encrypted message from an email server or message server 306 or message storage/database server 315 in accordance with the present invention.

There are three components required to view and encrypted message: the encrypted message, the client extension 409 and the non-enrolled recipient's private key. The method by which the non-enrolled recipient accesses these components can range from providing a link in a standard email message for the non-enrolled user to access the components as described in the previous section concerning browser based access, to providing a three components as attachments to a standard message as depicted in FIG. 3b or any combination of the two approaches.

As depicted in FIG. 3b, a non-enrolled user associated with a network-connected device 10 who desires to display an encrypted message that they have received on a secure basis (the "Recipient") first installs the client extension 409.

When the client extension 409 is available on the network-connected device 10, the Recipient invokes the decryption process and the encrypted private key for the secure message is passed to the client extension 409 in accordance with this aspect of the present invention.

The client extension 409 requests the non-enrolled Recipient to provide the pass phrase in order to decrypt and display the encrypted message.

The non-enrolled Recipient supplies the client extension 409 shared secret information in response to the shared secret request (FIG. 5) to the client extension 409 and concludes with submitting the form, typically by pressing a 'SUBMIT' button or equivalent.

The private key is then passed to the client extension 409 in accordance with this aspect of the present invention where upon the message signature can be verified and the message decrypted for display in the client application 40.

In another aspect of the present invention, the persistent field level encryption disclosed in the patent and Co-Pending patent applications is used for the purposes of the present invention to maintain the confidentiality of the identities of users (and for example their clients with whom they communicate on a secure basis) in accordance with the present invention and other personal information, by encrypting related data and storing the data in an encrypted form at a database (not shown) associated with the web server 106.

The system of the present invention is best understood as the overall system including the network connected device 10 and the resources thereof, including the application 22, and also the web server 106 and the email server or message server 306, the message/database storage server 315 as well as the resources of these as well. The computer program of the present invention is the application 22 on the one hand, but also the web application 16, on the other. Another aspect of the present invention includes the remote key server 310.

Figure 6:
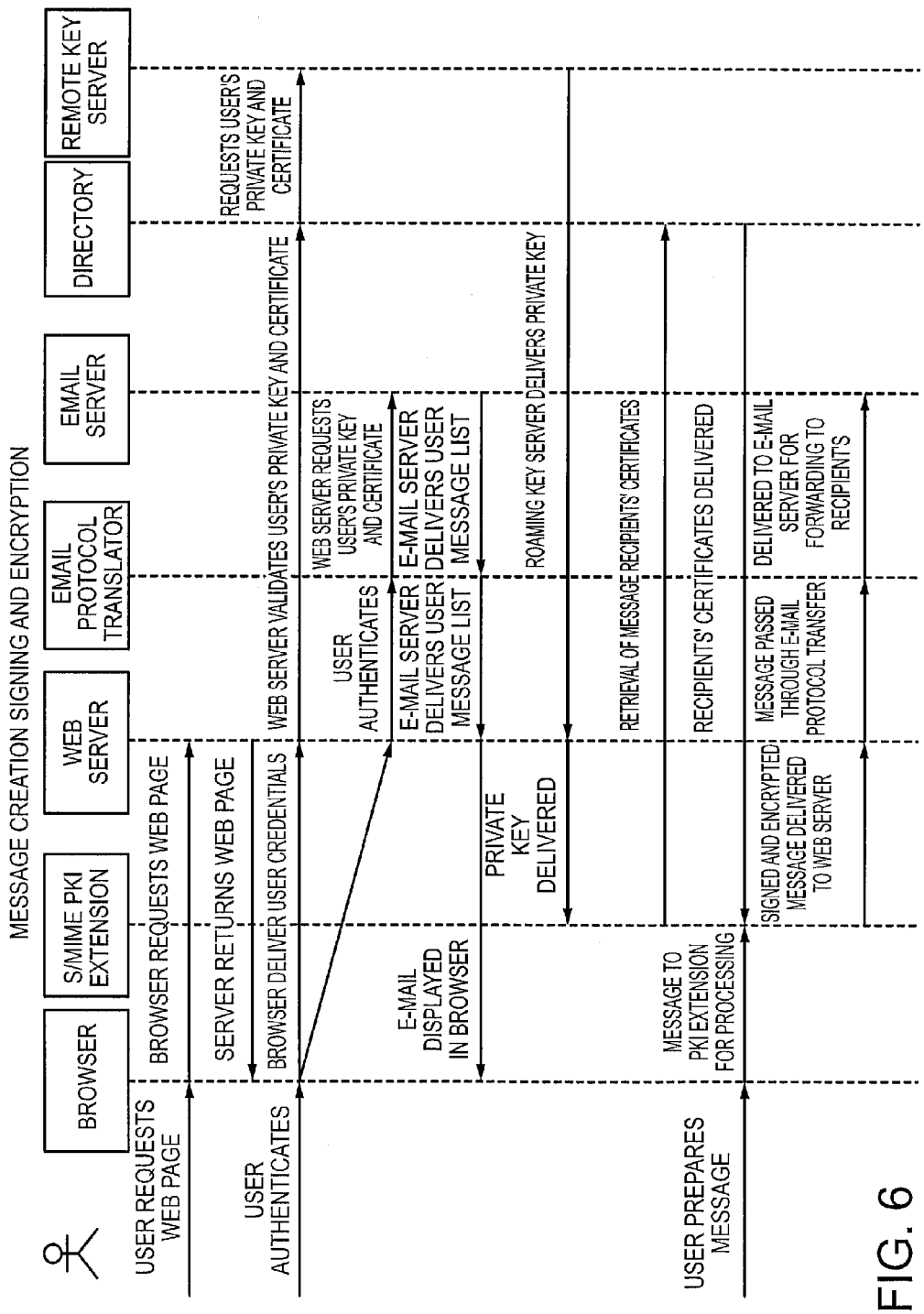
FIG. 6 is a flow chart that depicts the steps in signing and encrypting messages in connection with the various components of a PKI infrastructure.

FIG. 6 illustrates the interactions involved in signing and encrypting messages in relation to the various components of the PKI infrastructure.

A user associated with a network-connected device 10 who desires to create and send an email on a secure basis (the "Sender") signs on to the web server 106 using the browser 20 loaded on the network-connected device 10.

The web server 106, and specifically in co-operation with the web application 16 loaded on the web server 106, responds to the network-connected device 10 by presenting a web page that is a web form requesting that the user associated with the network-device 10 provide authentication in order to gain access to the web application 16, and specifically a secure message application (not shown) that is included in the web application 16.

The Sender supplies information in the authentication form fields (such as username and password) on the web page and concludes with submitting the form, typically by pressing a 'SUBMIT' button or equivalent.

The authentication credentials are passed to the web server 106. The web server 106 in turn delivers the authentication credentials to the email server or message server 306 via the email protocol translator 308 in one embodiment of the application or authenticates user credential for the message storage/database server 315 in an alternate embodiment of the application.

Specifically in accordance with the aspect of the present invention whereby the roaming key server 310 is used to access the User Certificate and Private Key from the User Certificate and Private Key Store 302, the web server 106 also transfers the user credentials to the roaming key server 310.

The email server or message server 306 authenticates the Sender and then passes back, through the email protocol translator 308, message waiting lists and other pertinent information about the Sender's email account to the web server 106 for display in the Sender's browser 20 and establishes an email session typically using a cookie, in a manner that is known.

The web server 106 authenticates the Sender for the message storage/database server 315 and then passes back message waiting lists and other pertinent information about the Sender's account to the web server 106 for display in the Sender's browser 20 and establishes a session typically using a cookie, in a manner that is known.

Again, in accordance with the aspect of the present invention utilizing the roaming key server 310, the roaming key server 310 authenticates the Sender and transmits the Sender's private key and certificate through the web server 106 to the browser extension 309. In accordance with the aspect of the present invention whereby the User Certificate and Private Key Store 302 resides on the network-connected device 10, the private key and certificate is accessed by the browser extension 304.

The Sender prepares a message by completing the appropriate fields of the web form referred to, including for example the message subject, body and intended recipient(s) fields. In one particular embodiment of the present invention, the application 22 also provides the recipient(s) the shared secret(s).

Security Services 312 is contacted whereby the recipient's (s') public keys and certificates are retrieved and optionally verified from the associated directory 314 or from the sender address book stored on the message storage/database server 315. In the event that the recipient(s)' public key(s) and certificate(s) cannot be retrieved from either location, application 22 of the present invention is invoked to create a shared secret (FIG. 4) and retrieves the PKC key pair of the trusted intermediary 316 by application 22 to secure the message for non-enrolled recipients.

The recipient information for non-enrolled recipients including the shared secret question which the recipient must answer (FIG. 5) is (are) sent by the sender and stored on the message storage/database server 315.

The message form data is passed to the application 22, including the browser extension 309, for signing and encrypting the message and any attachments using the private key of the Sender and the public key(s) of the recipient(s) and trusted intermediary 316 for non-enrolled recipients, in one embodiment of the invention to form an S/MIME compliant email message.

The message is returned to the browser 20 and sent from the browser 20 to the web server 106, and using the email protocol translator 308 to the email server or message server 306 for forwarding to the identified recipients in one embodiment of the invention. In another embodiment of the present invention the secured message for non-enrolled recipients is stored to the message storage/database server 315 and an email advisory is generated by the web application 16 and sent to the non-enrolled recipients advising of the secure message waiting and providing instructions on how to retrieve the secure message. In another embodiment, and for reasons of scaleability and efficiency of the encryption algorithm, the secured message for non-enrolled recipients is decrypted by the trusted intermediary 316, the digital signature is verified, and the message is re-encrypted using a symmetric key unique to the trusted intermediary 316 and stored to the message storage/database server 315 (with an optional copy of the original message stored to a message archive).

The method of the present invention is best understood as a process for exchanging PKI encrypted messages and S/MIME messages through a browser, whether a web browser or WAF browser or message client whether personal computer based or wireless device based, for recipients who are not enrolled in a PKI or where the sender does not have access to the PKI credentials of the recipient.

The method of the present invention should also be understood as a method for integrating wireless devices with Internet secure messaging using S/MIME or PKI based message encryption for non-enrolled recipients. Another aspect of the method of the present invention is a method for delivering private keys to non-enrolled recipients, through the Internet or a wireless network. Yet another aspect of the method of the present invention, is a method for eliminating the "man in the middle" security hole of proxy based gateways between the Internet and wireless networks by providing persistent secure data communication using S/MIME or PKI for encrypting messages. A still other aspect of the present invention is a method for allocating data resources as between the web server and a wireless device such that PKI is provided on the wireless device so as to provide encryption on a persistent basis.

The present invention also provides for persistent field level encryption on a selective basis throughout an Internet-based data process. This promotes efficient, utilization of resources by invoking PKI operations in relation to specific elements of an Internet based data process where security/authentication is most needed.

The present invention also provides a set of tools whereby PKI encryption and S/MIME capability is added to a browser in an efficient manner for non enrolled recipients.

The present invention should also be understood as a set of tools for complying with legal digital signature requirements, including in association with a wireless device using a web email or client based email system incorporating S/MIME for non-enrolled recipients.

We claim:

1. A non-transitory computer program product operable on a network-connected device for exchanging PKI compliant messages between a sender and one or more recipients, whereby the sender does not have access to the PKI credentials of at least one of the one or more recipients, said at least one of the one or more recipients corresponding to a non-credentialed recipient, said non-transitory computer program product comprising:
   (a) a Public Key Cryptographic utility linked to a browser or a client communication program, or forming part of the browser or the client communication program, the Public Key Cryptography utility being configured to perform one or more cryptographic operations including encrypting/decrypting data, authenticating data, and/or authenticating a sender, decrypting and/or verifying data, the Public Key Cryptography utility being configured on a computer of the sender to:
      (i) perform one or more of such cryptographic operations so as to create an encrypted message for communication to the recipient; and
      (ii) identify that the sender does not have access to the PKI credentials of the non-credentialed recipient, and thereby initiate the creation of a secret shared between the sender and the non-credentialed recipient; and
   wherein the Public Key Cryptographic utility cooperates with a server to invite the recipient to provide the shared secret so as to: (i) obtain the encrypted message in a decrypted form in a secure session with the server; or (ii) activate a Public Key Cryptography utility linked to the second network-connected device or to the server so as to access a private key linked to the encrypted message thereby enabling the Public Key Cryptography utility to decrypt the encrypted message.

2. The computer program product claimed in claim 1, wherein the Public Key Cryptography utility is operable to:
   (a) create a public key and private key for the encrypted message;
   (b) encrypt the private key with the shared secret.

3. The computer program product claimed in claim 1, wherein the Public Key Cryptography utility is operable on a computer associated with the recipient to:
   (a) obtain a question associated with the shared secret;
   (b) deliver the shared secret as an answer to the question, thereby authenticating the non-credentialed recipient to a server computer thereby obtaining access to the encrypted message in decrypted form in a secure session, or activating a Public Key Cryptography utility on a server computer or on the recipient computer to release the private key and thereby decrypt the message.

4. A method for sending an encrypted email message from a sender computer to a non-credentialed recipient at a recipient computer via a communication network, said method comprising:
   generating an email message at the sender computer;
   retrieving one or more credentials associated with the non-credentialed recipient;
   if said one or more credentials are unavailable generating a shared secret question having a shared secret answer;
   utilizing a public key cryptography utility to encrypt said email message;
   sending the encrypted email message to the recipient computer via the communication network;
   notifying the non-credentialed recipient of the encrypted email message;
   providing the non-credentialed recipient with said shared secret question and receiving a shared secret answer to the shared secret question from the non-credentialed recipient; and
   verifying the answer from the non-credentialed recipient and if verified providing the recipient computer with a decryption code for decrypting the encrypted email message, said decryption code comprising a private key associated with a public key, and said private key being encoded based on said shared secret.

5. A system for sending an encrypted email message to a non-credentialed recipient at a recipient computer via a communication network, said system comprising:
   an application configured for generating an email message;
   an application configured for retrieving one or more credentials associated with the non-credential recipient;
   an application configured for generating a shared secret question having a shared secret answer if said one or more credentials are unavailable;
   an application comprising a public key cryptography utility configured for encrypting said email message and sending the encrypted email message to the recipient computer via the communication network;
   an application configured for notifying the non-credentialed recipient of the encrypted email message;
   an application configured for providing the non-credentialed recipient with the shared secret question and receiving a shared secret answer to the shared secret question from the non-credentialed recipient; and
   said application including a component for verifying the answer from the non- credentialed recipient and if verified providing the recipient computer with a decryption code for decrypting the encrypted email message, wherein said decryption code comprises a private key associated with a public key, and said private key is encoded based on said shared secret.

6. A non-transitory computer program product for sending an encrypted email message from a sender computer to a non-credentialed recipient at a recipient computer via a communication network, said non-transitory computer program product comprising:
   a storage medium configured for storing executable instructions;
   said executable instructions comprising instructions for,
   generating an email message at the sender computer;
   retrieving one or more credentials associated with the non-credentialed recipient;
   if said one or more credentials are unavailable generating a shared secret question having a shared secret answer;

utilizing a public key cryptography utility to encrypt said email message;

sending the encrypted email message to the recipient computer via the communication network;

notifying the non-credentialed recipient of the encrypted email message;

providing the non-credentialed recipient with the shared secret question and receiving a shared secret answer to the shared secret question from the non-credentialed recipient; and verifying the answer from the non-credentialed recipient and if verified providing the recipient computer with a decryption code for decrypting the encrypted email message, wherein said decryption code comprises a private key associated with a public key, and said public key cryptography utility, and said private key is encoded based on said shared secret.

7. A system for sending an encrypted email message to a non-credentialed recipient at a recipient computer via a communication network, said system comprising:

an email component configured to generate an email message;

a credential retrieval component configured to retrieve one or more credentials associated with the non-credentialed recipient;

a shared secret generation component configured to generate a shared secret question having a shared secret answer if said one or more credentials are unavailable;

an encryption component comprising a public key cryptography utility configured to encrypt said email message;

said email component being configured to send said encrypted email to the recipient computer via the communication network;

a notification component configured to notify the non-credentialed recipient of the encrypted email message;

a verification component configured to provide the non-credentialed recipient with the shared secret question; and said verification component being configured to receive a shared secret answer from the non-credentialed recipient and comprising a logic component configured to verify said shared secret answer from the non-credentialed recipient, and if verified, said verification component comprising a release component configured to release a decryption code for decrypting the encrypted email message at the recipient computer, wherein said decryption code comprises a private key associated with a public key in said public key cryptography utility, and said private key being encoded with said shared secret answer.

* * * * *